United States Patent
Byers et al.

(10) Patent No.: US 10,243,878 B2
(45) Date of Patent: Mar. 26, 2019

(54) FOG COMPUTING NETWORK RESOURCE PARTITIONING

(71) Applicant: Cisco Technology, Inc., San Jose, CA (US)

(72) Inventors: Charles Calvin Byers, Wheaton, IL (US); Gonzalo Salgueiro, Raleigh, NC (US); Joseph Michael Clarke, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 454 days.

(21) Appl. No.: 15/184,171

(22) Filed: Jun. 16, 2016

(65) Prior Publication Data
US 2017/0366472 A1 Dec. 21, 2017

(51) Int. Cl.
*H04L 29/08* (2006.01)
*H04L 12/911* (2013.01)

(52) U.S. Cl.
CPC .......... *H04L 47/821* (2013.01); *H04L 67/10* (2013.01)

(58) Field of Classification Search
CPC . H04L 67/34; H04L 41/5009; H04L 41/5012; H04L 41/5019; H04L 41/5035; H04L 47/821; H04L 12/911; H04L 29/08
See application file for complete search history.

(56) References Cited

U.S. PATENT DOCUMENTS

| 7,272,651 | B1 * | 9/2007 | Bolding | H04L 47/2441 709/227 |
| 9,032,072 | B2 * | 5/2015 | Leung | H04L 43/08 370/254 |
| 2009/0077238 | A1 * | 3/2009 | Gao | H04L 41/0896 709/226 |
| 2012/0129560 | A1 * | 5/2012 | Lunden | H04W 72/10 455/512 |

(Continued)

OTHER PUBLICATIONS

An Efficient Architecture and Algorithm for Resource Provisioning in Fog Computing, Jan. 2016. By Agarwal et al.*

*Primary Examiner* — Sargon N Nano
(74) *Attorney, Agent, or Firm* — Behmke Innovation Group LLC; James Behmke; Stephen D. LeBarron

(57) ABSTRACT

Various implementations disclosed herein enable improved allocation of fog node resources, which supports performance driven partitioning of competing client applications. In various implementations, methods are performed by a fog orchestrator configured to determine allocations of fog resources for competing client applications and partition the competing client applications based on the fog resource allocations. Methods include receiving reservation priority values (RPVs) associated with a plurality of client applications competing for a contested fog node resource, transmitting, to a subset of client devices, a request to provide updated RPVs, and awarding the contested fog node resource to one of the plurality of client applications based on the received RPVs and any updated RPVs. In various (Continued)

implementations, methods also include determining, for each of the plurality of client applications, a respective mapping for a respective plurality of separable components of the client application based on the awarded contested fog node resource.

20 Claims, 6 Drawing Sheets

(56) References Cited

U.S. PATENT DOCUMENTS

| | | | | |
|---|---|---|---|---|
| 2012/0265879 | A1* | 10/2012 | Casebolt | G06F 9/468 709/225 |
| 2013/0212212 | A1* | 8/2013 | Addepalli | G06F 9/461 709/217 |
| 2013/0297769 | A1* | 11/2013 | Chang | G06F 9/45558 709/224 |
| 2014/0379924 | A1* | 12/2014 | Das | H04L 47/72 709/226 |
| 2015/0215433 | A1* | 7/2015 | Leung | H04L 43/08 709/224 |
| 2017/0272365 | A1* | 9/2017 | Wei | H04L 45/302 |
| 2017/0366472 | A1* | 12/2017 | Byers | H04L 67/10 |
| 2017/0371717 | A1* | 12/2017 | Kiess | G06F 9/5077 |
| 2018/0063020 | A1* | 3/2018 | Bhagavatula | H04L 47/781 |
| 2018/0295066 | A1* | 10/2018 | Pawar | H04L 47/724 |

\* cited by examiner

FOG COMPUTING NETWORK RESOURCE PARTITIONING

TECHNICAL FIELD

The present disclosure generally relates to fog computing networks, and in particular, to partitioning competing client applications across fog computing resources.

BACKGROUND

The emergence of the Internet of Things (IoT) is extending the availability of network computing and resources to a wide range of devices and systems that have previously been excluded from data networking environments. A goal of doing so is to enable higher levels of automation by enabling machines of various complexity and purposes to communicate without reliance on human intervention and/or patchworks of specialized interfaces. The majority of devices, sensors, and actuators (the "things") that will be network-enabled in this manner will typically be included in much larger systems providing new forms of automation. Fog computing helps enable these larger systems by moving the computation, networking and storage capabilities of the cloud closer to the edge. Given the projected scale of such systems, the demand for fog node resources is expected to be high.

Previously available cloud solutions (e.g., computing and storage) have a number of drawbacks and limitations that preclude previously available cloud solutions from satisfying the performance demands of IoT applications. For example, previously available cloud solutions provide insufficient performance in the areas of: satisfying low latency thresholds; supporting for highly mobile endpoint devices; and providing real-time data analytics and decision making. Previously available cloud solutions are also not well suited for the type of demand generated by fixed and mobile endpoint devices densely spread across geographic areas and/or operating within heterogeneous domains. Previously available cloud solutions could also have reliability and security concerns.

Fog computing networks (hereinafter "fog networks") are being developed as a solution to satisfy the performance demands of IoT applications. Fog networks provide computing and storage resources closer to the edge of networks, as opposed to the remote and centralized clustering of previously available cloud solutions. Endpoint client devices and near-user endpoint devices, of fog networks, are configured to collaboratively service client applications at the edge of a network—close to the things seeking resources. However, the distributed and ad hoc nature fog networks present challenges for managing competing multi-tenant applications, which are typically serviced using a pre-defined priority mechanism, such as first-in-first-out.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
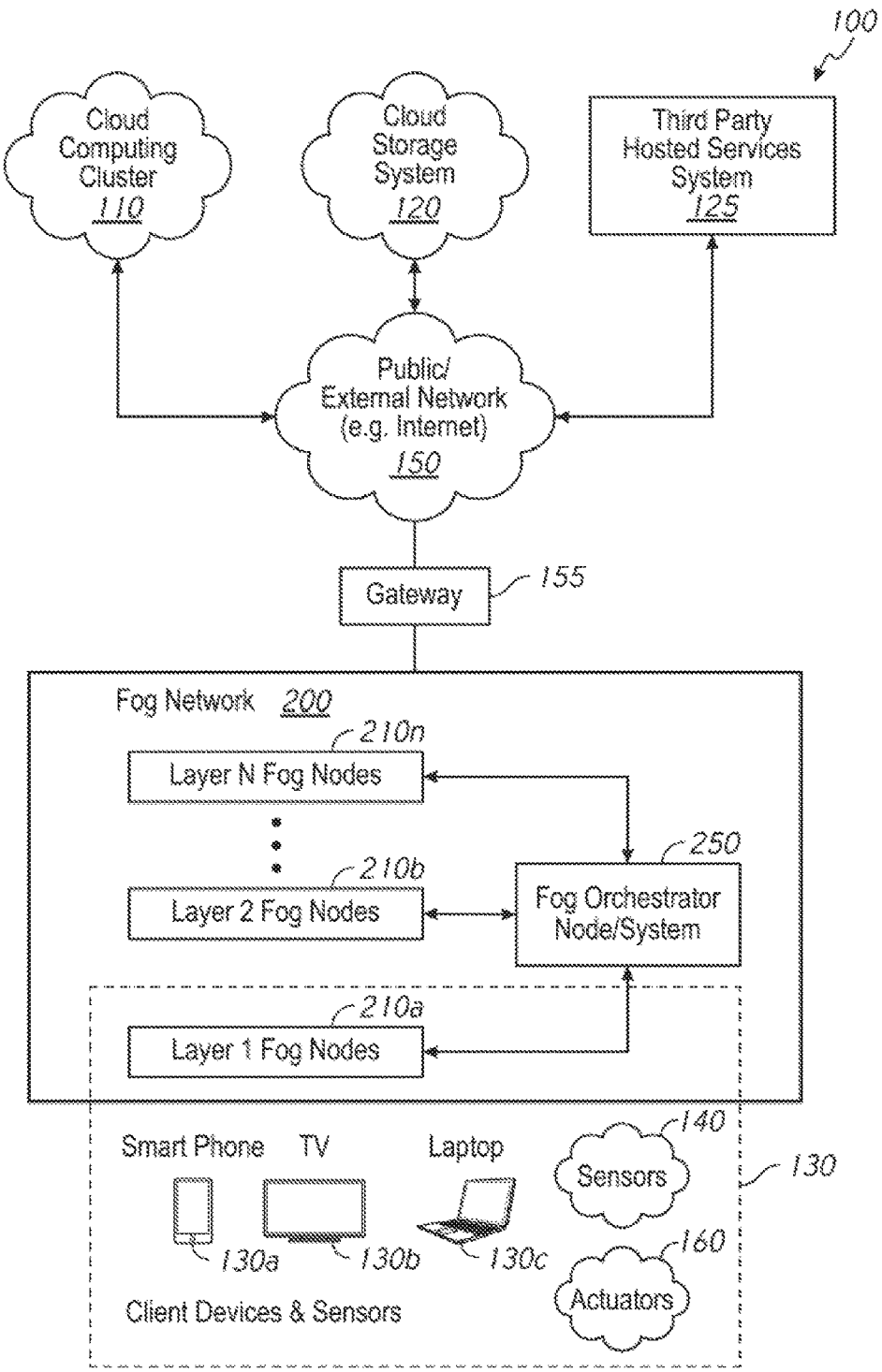
FIG. 1 is an illustration of a data networking environment that includes a fog network in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. For example, well-known systems, methods, components, devices and circuits have not been described in exhaustive detail so as not to obscure more pertinent aspects of the example implementations described herein.

Overview

Previously available cloud solutions (e.g., computing, network processing, and storage) have a number of drawbacks and limitations that preclude them from satisfying performance demands of IoT applications. Fog networks may be better suited for IoT applications. However, the distributed and ad hoc nature fog networks present a number of challenges for managing competing client applications in a multi-tenant system. In particular, previously available fog network solutions fail to adequately manage fog node resources in a competitive multi-tenant system, and in turn, create service bottlenecks that deteriorate and severely limit performance and efficiency of fog networks.

By contrast, various implementations disclosed herein enable improved allocation of fog node resources (e.g., processors, memory, interfaces, bandwidth, etc.), that in turn, supports performance driven partitioning of competing client applications in a multi-tenant system. For example, in various implementations, methods are performed by a fog orchestrator configured to determine allocations of fog resources for competing client applications and partition the competing client applications based on the fog resource allocations, the fog orchestrator including a non-transitory memory, one or more processors, and one or more network interfaces. In various implementations, methods include receiving, from a plurality of client devices, reservation priority values (RPVs) associated with a plurality of client applications competing for a contested fog node resource. In various implementations the methods also include transmitting, to a subset of the plurality of client devices, a request to provide updated RPVs for the contested fog node resource, and awarding the contested fog node resource to one of the plurality of client applications based on the received RPVs and any updated RPVs received in response to the transmitted request. In various implementations, methods also include determining, for each of the plurality of client applications, a respective mapping for a respective plurality of separable components of the client application based on the awarded contested fog node resource, each respective mapping includes assignment of the respective plurality of separable components to fog node resources within the fog network.

Example Embodiments

FIG. 1 is an illustration of a data networking environment 100 that includes a fog network in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. As a non-limiting example, the data networking environment 100 includes a cloud computing cluster 110, a cloud storage system 120, a third party hosted services system 125, a public/external network 150 (e.g., a portion of publicly accessible Internet nodes or the like), a fog network 200, and a number of client devices and sensors—collectively referred to as client devices and sensors 130 for the sake of brevity. Also, while FIG. 1 includes a particular number of the aforementioned elements, those of ordinary skill in the art will appreciate from the present disclosure that any number of the aforementioned elements are included in various implementations.

In various implementations, the third party hosted services system 125 provides various third-party content and services, such as email, media content, online banking, social networking servers, etc. Similarly, the cloud computing cluster 110 and the cloud storage system 120 respectively provide subscription-based (or private) remote computing and subscription-based (or private) remote storage solutions, either of which may be provided in-network by an operator and/or by a third party. Other than providing remote resources (e.g., core network or far from the edge), and sources and/or destinations for client data traffic, an exhaustive description of numerous examples of third-party services, cloud computing and cloud storage are not particularly pertinent to the scope of the present disclosure. As such, no further details pertaining to either of the cloud computing cluster 110, the cloud storage system 120, or the third party hosted services system 125 are provided for the sake of brevity.

In various implementations, the gateway device 155 connects the fog network 200 to the public network 150 (e.g., through an ISP node, wireless base station, or the like (not shown)), and includes features such as a firewall. In some implementations, the gateway device 155 is provided as a single entity (e.g., a server, a virtual machine, etc.). In some implementations, the gateway device 155 includes a distributed system including a suitable combination of software, data structures, virtual machines, computing devices, servers, switches and routers, beneficial to provide local computation, networking and storage capabilities. Merely for the sake of brevity and convenience for the following description, the gateway device 155 is described herein as a single entity. Moreover, other than providing communication channels for client data traffic, an exhaustive description of the numerous examples of gateway devices are not particularly pertinent to the scope of the present disclosure.

As noted above, FIG. 1 also includes a number of client devices and sensors 130. For example, the client devices and sensors 130 include a smartphone 130a, a television (TV) 130b, a laptop computer 130c, a pool of sensors 140, and pool of actuators 160. As with the other elements illustrated in FIG. 1, those of ordinary skill in the art will appreciate that any number of client devices and sensors 130 may be used in combination within the data networking environment 100 in accordance with various implementations. Client devices and sensors 130 generally include any suitable computing device, such as a computer, a laptop computer, a tablet device, a netbook, an Internet kiosk, a personal digital assistant, a mobile phone, a smartphone, a wearable, a gaming device, a computer server, etc. In some implementations, each client device (e.g., smartphone 130a, TV 130b, laptop 130c, etc.) includes one or more processors, one or more types of memory, a display and/or other user interface components such as a keyboard, a touch screen display, a mouse, a track-pad, a digital camera and/or any number of supplemental devices to add functionality. In some implementations, a client device includes a suitable combination of hardware, software and firmware configured to provide at least some of protocol processing, modulation, demodulation, data buffering, power control, routing, switching, clock recovery, amplification, decoding, and error control. Moreover, while FIG. 1 includes a pool of sensors 140 as an illustrative example, those of ordinary skill in the art will appreciate that in various implementations the collection of client devices and sensors 130 also includes various other types of devices and actuators enabled with network connectivity suitable for integrated with IoT applications and services.

Fog networks provide computing, storage and connectivity resources closer to the edge of networks, as opposed to remote and centralized clustering of previously available cloud solutions. As compared to cloud computing and storage solutions, fog network configuration and resource provisioning emphasizes proximity to endpoint devices, dense geographical distribution, local resource pooling, latency reduction, and edge data processing and mining, in order to improve responsiveness and redundancy. Additionally, while cloud solutions rely heavily on connectivity resources of a network, cloud solutions do not provide connectivity resources because they are not typically provisioned by network operators—and thus cannot influence or control connectivity resources. Computing, storage and connectivity nodes of a fog network are referred to as fog nodes, and form a hierarchy extending between a gateway device and endpoint devices (e.g., client devices and sensors 130).

As shown in FIG. 1, in various implementations, the fog network 200 includes a fog orchestrator system (or node) 250 (hereinafter "fog orchestrator 250") and a number of layers of fog nodes 210a, 210b, . . . , 210n. The layers of fog nodes 210a, 210b, . . . , 210n form a hierarchical network between the gateway device 155 and the client devices and sensors 130.

In some implementations, one or more of the client devices and sensors 130 are configured to function as respective fog nodes within the fog network 200. For example, in some use cases, as indicated by the dashed box around the first layer of fog nodes 210a and the client devices and sensors 130, one or more of the client devices and sensors 130 are treated as fog nodes by the fog orchestrator 250. As such, the fog orchestrator 250 includes computing, storage and connectivity resources of some of the client devices and sensors 130 in the pool of available fog node resources of the fog network 200. In various implementations, one or more of the client devices and sensors 130 are configured to selectively limit or wholly restrict the fog orchestrator 250 from allocating local resources to other client devices. That is, in various implementations, a client device is configured to either opt into or opt out of sharing onboard computing, storage and connectivity resources with other client devices of the fog network 200.

As described in greater detail with reference to FIGS. 2 and 4, each layer of fog nodes 210a, 210b, . . . , 210n includes a number of fog nodes (not shown in FIG. 1). As described in greater detail below with reference to FIG. 3, each fog node provides a combination of network accessible resources that can be allocated to portions of one or more client applications. Moreover, while FIG. 1 shows that fog nodes are arranged in well-defined layers 210a, 210b, . . . , 210n, those of ordinary skill in the art will appreciate that a hierarchy of a fog network is often far less well-defined than is shown in FIG. 1. More generally, in various implementations, a fog network includes a highly distributed and ad hoc arrangement of fog nodes, and fog node layers are defined by relative distance ranges and/or latency ranges relative to a gateway device and/or endpoint devices at the edge of the fog network.

As discussed in greater detail below, fog computing, storage and connectivity resources closest to the edge of the network tend to experience the greatest demand from client applications because in an uncompetitive environment those nodes typically provide preferred performance. However, the distributed and ad hoc nature fog networks present challenges for managing competing client applications, which are typically serviced in a first-in-first-out manner. In particular, in a competitive multi-tenant environment, unfettered access to the lowest layers of a fog network create service bottlenecks that deteriorate and severely limit performance. As such, in various implementations, the fog orchestrator 250 is configured to service competing client applications using fog nodes further away from the edge of the network while maintaining performance demands of the client applications.

As described below with reference to FIGS. 2, 4 and 5, in accordance with various implementations, a client application is serviced by partitioning portions of the client application into one or more sub-processes, which are then serviced by different layers of the fog network. To that end, in various implementations, the fog orchestrator 250 is configured to determine allocation of fog node resources (e.g., processors, memory, interfaces, bandwidth, etc.), that in turn, supports performance driven partitioning of competing client applications in a competitive multi-tenant system. Briefly, for example, in various implementations, the fog orchestrator 250 is configured to receive reservation priority values (RPVs) from a number of competing client devices competing for a particular fog node resource, allocate the particular fog node resource to one or more of the competing client devices based on the RPVs, and repartition portions of the respective competing client applications based on the award of the particular fog node resource. More specific examples of the operation of the fog orchestrator 250 are described below with reference to FIGS. 4 and 5.

Figure 2:
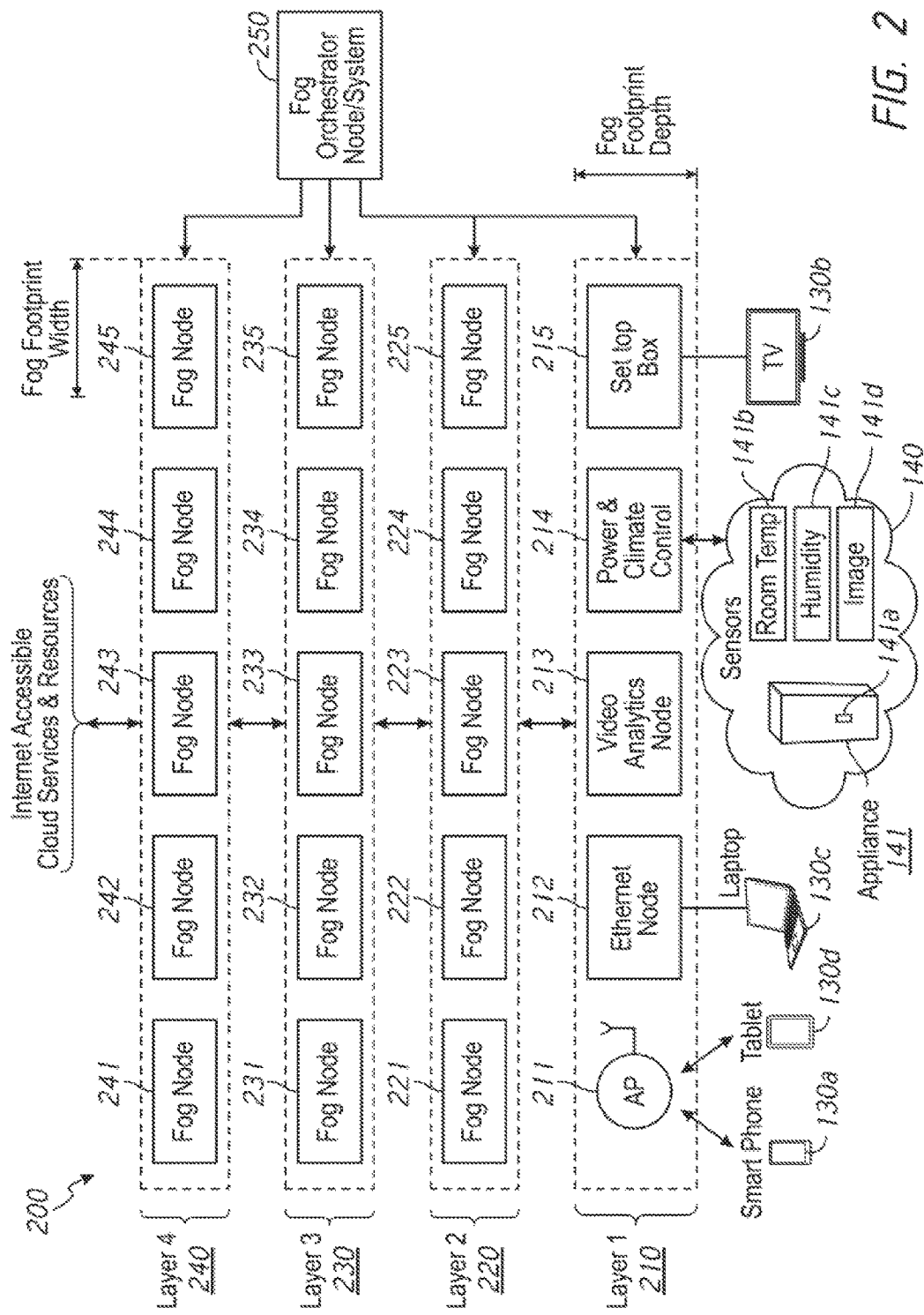
FIG. 2 is a block diagram of a fog network environment in accordance with some implementations.

FIG. 2 is a more detailed example illustration of the fog network 200 of FIG. 1 in accordance with some implementations. Again, while pertinent features are shown, those of ordinary skill in the art will appreciate from the present disclosure that various other features have not been illustrated for the sake of brevity and so as not to obscure more pertinent aspects of the example implementations disclosed herein. Moreover, elements common to FIGS. 1 and 2 include common reference numbers, and only the differences between FIGS. 1 and 2 are described herein for the sake of brevity.

To that end, as a non-limiting example, the fog network of FIG. 2 includes a number of endpoint devices, including the aforementioned pool of sensors 140, the smartphone 130a, the TV 130b, the laptop 130c, and the tablet computing device 130d. The pool of sensors 140 includes, for example and without limitation, an appliance sensor 141a provided in combination with an appliance 141 (e.g., a refrigerator, a convection oven, etc.), one or more room temperature sensors 141b, one or more humidity sensors 141c, and one or more image sensors 141d.

Continuing the example, the fog network 200 also includes four fog node layers 210, 220, 230, 240 arranged between endpoint devices and connectivity to remotely located Internet accessible cloud services and resources (e.g., through gateway device 155 of FIG. 1). As noted above, while FIG. 2 shows that fog nodes are arranged in well-defined layers 210, 220, 230, 240, those of ordinary skill in the art will appreciate that a hierarchy of a fog network is often far less well-defined than is shown in FIG. 2. More generally, in various implementations, a fog network includes a highly distributed and ad hoc arrangement of fog nodes, and fog node layers are defined by relative distance ranges and/or latency ranges relative to a gateway device and/or endpoint devices at the edge of the fog network. Moreover, while four fog node layers are illustrated in FIG. 2, those of ordinary skill in the art will appreciate from the present disclosure that in various implementations a fog network includes any number of fog node layers, which are defined by relative distance ranges and/or latency ranges.

The first fog node layer 210 is closest to the endpoint devices, and includes a wireless access point (AP) 211, an Ethernet node 212, a video analytics node 213, a power and climate control node 214, and a cable (or the like) set-top box 215. As shown FIG. 2, the AP 211 provides wireless access to the smartphone 130a and the tablet computing device 130d. Similarly, the Ethernet node 212 is coupled to the laptop 130c, the pool of sensors 140 is coupled to the power and climate control node 214 and/or the video analytics node, and the TV 130b is coupled to the set-top box 215. As shown in FIG. 2, each of the fog nodes in the first fog node layer 210 has a specific function. However, more generally, in some implementations, one or more fog nodes in the first fog node layer 210 are configured to provide fog computing, storage and connectivity resources and may or may not have a specific function within the fog network 200 beyond providing computing, storage and connectivity resources.

The second fog node layer 220 is arranged between the first fog node layer 210 and the third fog node layer 230. As shown in FIG. 2, as an illustrative example, the second fog node layer 220 includes four fog nodes 221, 222, 223, 224, 225 that each provide a combination of fog computing, storage and connectivity resources to the fog network 200. As an illustrative example, a more detailed block diagram of the fog node 223 is described below with reference to FIG. 3. The third fog node layer 230 is arranged between the second fog node layer 220 and the fourth fog node layer 240. As shown in FIG. 2, as an illustrative example, the third fog node layer 230 includes four fog nodes 231, 232, 233, 234, 235 that each provide a combination of fog computing, storage and connectivity resources to the fog network 200. The fourth fog node layer 240 is arranged between the third fog node layer 230 and connectivity to remotely Internet accessible cloud services and resources (e.g., through gateway device 155 of FIG. 1). As shown in FIG. 2, as an illustrative example, the fourth fog node layer 240 includes four fog nodes 241, 242, 243, 244, 245 that each provide a combination of fog computing, storage and connectivity resources to the fog network 200.

The fog orchestrator 250 is coupled to each of the fog node layers 210, 220, 230, 240 directly or indirectly. In various implementations, the fog orchestrator 250 is provided as a single entity (e.g., a server, a virtual machine, etc.). In some implementations, the fog orchestrator 250 includes a distributed system including a suitable combination of software, data structures, virtual machines, computing devices, servers, switches and routers, beneficial to provide local computation, networking and storage capabilities. In some implementations, the fog orchestrator 250 is integrated into one or more of the aforementioned fog nodes. Merely for the sake of brevity and clarity for the following description, the fog orchestrator 250 is described herein as a single entity that is separate from the various aforementioned fog nodes.

Figure 3:
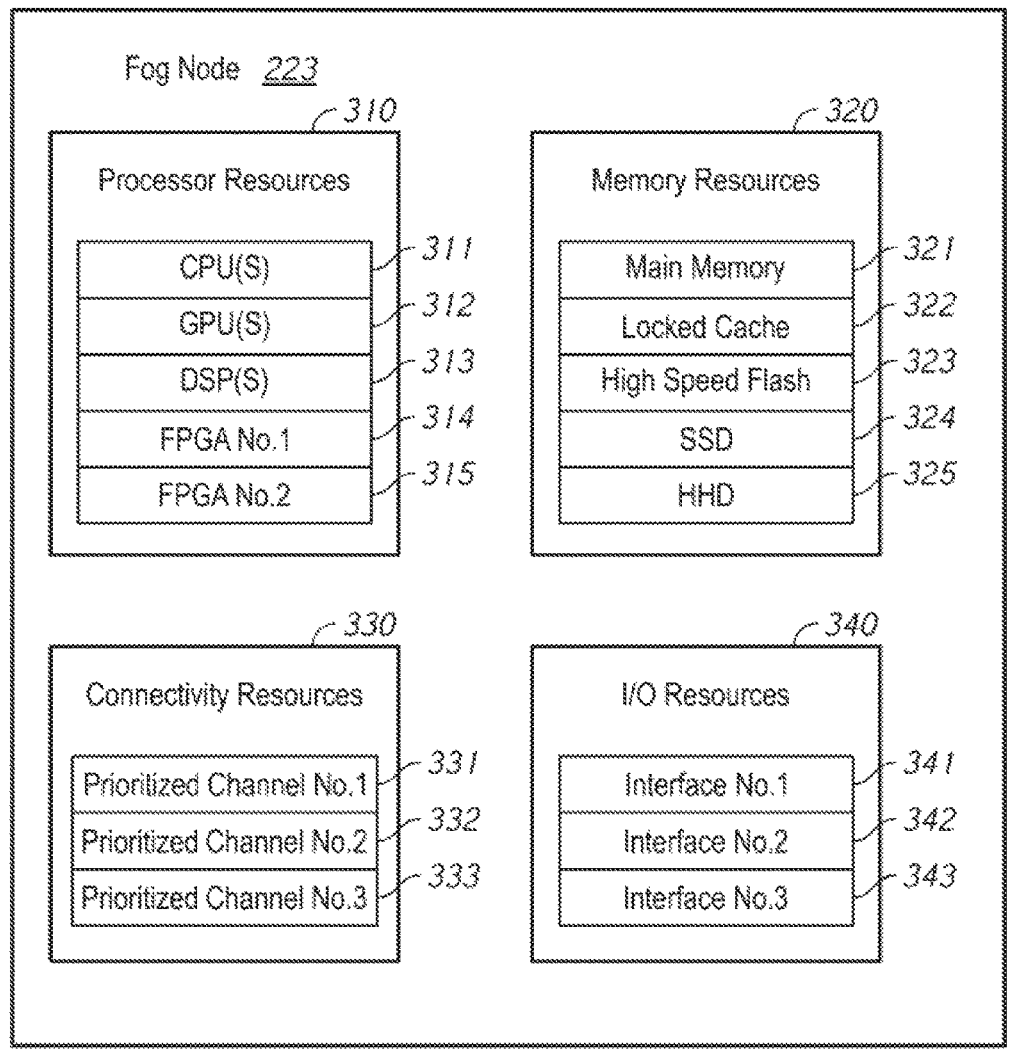
FIG. 3 is a block diagram of a fog node according to some implementations.

FIG. 3 is a more detailed block diagram of the aforementioned fog node 223 according to some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the fog node 223 includes a number of resource groupings including processor resources 310, memory resources 320, connectivity resources 330, and I/O (input-output) interface resources 340.

In various implementations, the processor resources 310 include a combination of one or more computing devices—such as central processing units (CPUs), graphical processing units (GPUs), digital signal processors (DSPs), field programmable gate arrays (FPGAs), etc. For example, as shown in FIG. 3, the processor resources 310 include one or more CPUs 311, one or more GPUs 312, one or more DSPs 313, a first FPGA 314, and a second FPGA 315. In some implementations, each of the processor resources 310 satisfies one or more different performance measures (e.g., task specific processing performance, general computational speed, etc.). As such, each of the processor resources 310 is considered more suitable for some IoT applications and possibly less desirable for other IoT applications, depending on where in the fog network hierarchy a fog node is located.

In various implementations, the memory resources 320 include a combination of one or more storage devices. For example, as shown in FIG. 3, the memory resources 320 include a main memory (non-transitory) 321, a locked cache 322, high speed flash 323, a solid state drive (SSD) 324, and a hybrid hard drive (HHD) 325. In some implementations, each of the memory resources 320 satisfies one or more different performance measures. As such, each of the memory resources 320 is considered more suitable for some IoT applications and possibly less desirable for other IoT applications, depending on where in the fog network hierarchy a fog node is located.

In various implementations, the connectivity resources 330 of the fog node 223 include a combination one or more prioritized data channels. For example, as shown in FIG. 3, the connectivity resources 330 include first, second and third prioritized channels 331, 332, 333 that the fog node 223 has access to and control over. In some implementations, each of the connectivity resources 330 satisfies one or more different performance measures (e.g., latency, total routing hops, expected packet loss, security, etc.). As such, each of the connectivity resources 330 is considered more suitable for some IoT applications and possibly less desirable for other IoT applications, depending on where in the fog network hierarchy a fog node is located.

In various implementations, the interface resources 340 of the fog node 223 include a combination one or more network interfaces (e.g., optical ports, Ethernet ports, wireless modems providing an air interface, application specific IoT interfaces etc.). For example, as shown in FIG. 3, the connectivity resources 330 include first, second and third interfaces 341, 342, 343 included within the fog node 223. In some implementations, each of the interface resources 340 satisfies one or more different performance measures. As such, each of the interface resources 340 is considered more suitable for some IoT applications and possibly less desirable for other IoT applications, depending on where in the fog network hierarchy a fog node is located.

Referring again to FIG. 2, in operation, many IoT applications have stringent demands pertaining to latency and other performance metrics that create a bias towards running applications low in the hierarchy. Other factors that may add or lead to this bias include: network bandwidth (e.g., lower level processing can reduce the bandwidth sent over expensive links to higher layers); security (e.g., it is often desirable to perform strong crypto-processing close to the client devices and sensors); reliability (e.g., low layers can continue to provide at least a subset of network services even if higher order layers or the cloud are unreachable or overloaded); and, geographic locality (e.g., where there is a preference to processing data close to client devices and sensors to avoid the need to send it higher in the hierarchy or to a foreign region). Running applications low in the hierarchy of the fog network 200 can improve round-trip latency because the endpoints are able to use fog nodes close to the edge of the network (and thus close to the endpoints themselves). For example, IoT applications (e.g., a geofencing application) associated with the one or more image sensors 141d may achieve higher performance by using the video analytics node 213. However, when demand is high from multiple clients, the video analytics node 213 can become the bottleneck and performance may suffer. As such, reinforcing a bias to merely run applications low in a fog network hierarchy can introduce complexity, inefficiency, congestion, and degradation and/or limits on performance.

As described below with reference to FIGS. 4 and 5, aspects of various implementations include methods to determine and optimize the width of a fog footprint and/or the depth of a fog footprint for each of one or more competing client applications. As shown in FIG. 2, the width of a fog footprint for a particular client application is characterized by how many fog nodes within a fog node layer are used to service the client application. Some of the computation, networking or storage operations of fog network 200 can be balanced across multiple members of a single layer of the hierarchy. Those of ordinary skill in the art will appreciate that the fog nodes in one layer utilized to service a client application do not necessarily have to be adjacent to one another—either physically or link-wise. Similarly, the depth of fog footprint is characterized by how many fog node layers of the fog network 200 are used to service the client application. Additionally and/or alternatively, aspects of various implementations include methods to determine partitioning of one or more client applications. As presented herein partitioning a client application includes determining how the parts (i.e., separable components that could be run in parallel, in sequence, or in a hierarchal network model) of a client application are assigned to fog nodes within and/or across fog node layers in the fog network 200 for execution (i.e., horizontally and vertically within the fog hierarchy).

In some implementations, parts of applications are characterized by interfaces and data formats that each part uses to interface with other parts of the same application and/or other applications. In accordance with various implementations, IoT applications include processing sequences, a processing pipeline, or a series of modular operations that together complete specified application-level operations. In accordance with various implementations, applications are configured to utilize the granularity within processing pipelines (or the like) in order to take advantage of multiple fog nodes. In this way applications are structured to enable the fog orchestrator 250 to repartition which stages of processing are executed by various fog nodes in the hierarchy in order to balance the load and manage resource allocation throughout the fog network 200 on an as needed basis. Factors that can affect where application parts are distributed throughout the fog network 200 include available capacity, latency, bandwidth, as well as specialized hardware for specific tasks/sub-tasks.

In accordance with various implementations, client applications are configured to include QoS telemetry within the application code that is capable of measuring the pertinent network parameters in place in real-time, and subsequently estimate the impact on the QoS associated with a client application. In various implementations, the fog orchestrator 250 obtains such parameters, and utilizes the parameters to generate characterizations of the instantaneous performance of the client applications. Additionally, the fog orchestrator 250 is also configured to predict adjustments to client application partitioning based on trending changes or history in QoS performance metrics relative to QoS targets.

Figure 4:
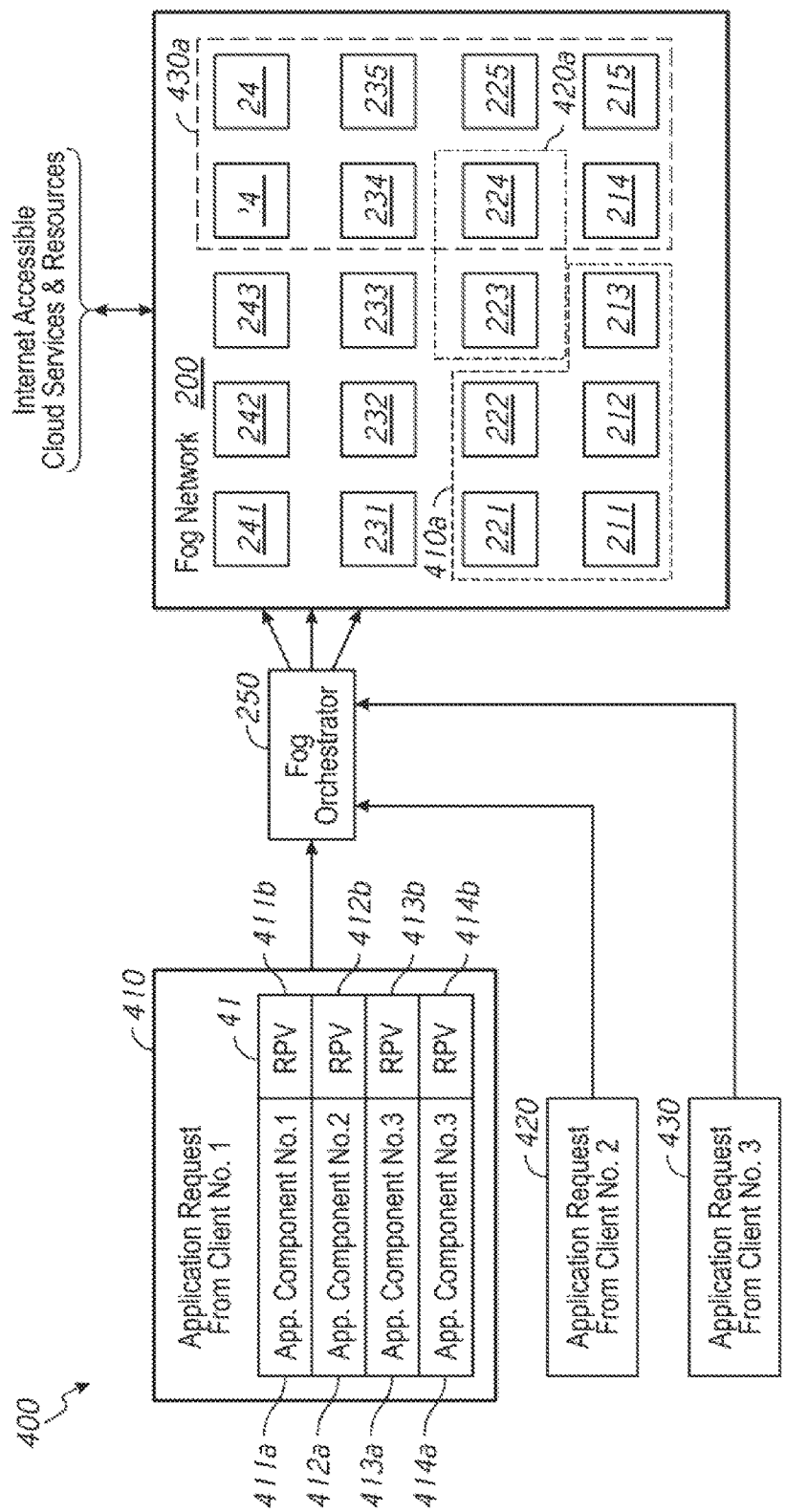
FIG. 4 is a block diagram illustrating fog node resource allocation, and client application service flow and partitioning in accordance with some implementations.

FIG. 4 is a block diagram 400 conceptually illustrating an example of fog node resource allocation and client application partitioning within the fog network 200 of FIG. 2 in accordance with some implementations. In particular, FIG. 4 conceptually illustrates the result of the fog orchestrator 250 performing fog node resource allocation and application partitioning performed in response to receiving first, second and third client application requests 410, 420, 430 from respective client devices (not shown). In other words, in operation the fog orchestrator 250 determines partitioning for each client application request 410, 420, 430, and fog node resource allocation for servicing portions of each client application associated with the client application requests 410, 420, 430 based on the determined partition. Moreover, while the example provided in FIG. 4 shows that client application requests are provided from client devices, those of ordinary skill in the art will appreciate from the present disclosure that client application requests may also originate from other systems (e.g., third party systems, cloud computing platforms, etc.).

Each of the first, second, and third client application requests 410, 420, 430 includes a request to run (i.e., service) a respective client application using the resources of the fog network 200. In order to assist the fog orchestrator 250, in accordance with various implementations, a client application request includes application component manifest. The application component manifest includes a listing of the separable components of the client application, and a respective reservation priority value (RPV) associated with each of the separable components. The RPV for each separable component provides an indication of the priority that that separable component of the client application has for the respective client. In other words, a RPV provides an indication of the performance target that the client device is expecting for that separable component of the client application under a service level agreement (SLA) with the fog network operator. In some implementations, a single RPV is provided for each of one or more of the separable components of a client application. In some implementations, a RPV is provided corresponding to a group of one or more components of the client application. In some implementations, multiple RPVs are enumerated for each application component in a respective application component manifest corresponding to different horizontal or vertical levels in a fog network. In this way, for example, an application component can be specified with a preference for operating on a specific level of the fog hierarchy, or a specific member of a certain level to meet some geographic proximity goals of the application.

With reference to FIG. 4, the first client application request 410 includes a client application manifest 411 listing first, second, third and fourth separable components 411*a*, 412*a*, 413*a*, 414*a*, each having a corresponding RPV 411*b*, 412*b*, 413*b*, 414*b*. While the first client application request 410 lists four separable components 411*a*, 412*a*, 413*a*, 414*a* associated with a client application as an illustrative example, those of ordinary skill in the art will appreciate from the present disclosure that a client application may have any number of separable components. Similarly, while respective client application manifests are not shown for the second and third client application requests 420, 430, those of ordinary skill in the art will appreciate from the present disclosure that each of the second and third client application requests 420, 430 includes a corresponding client application manifest—that includes separable components, and RPVs associated with each and/or collections of the separable components of respective client applications.

The fog orchestrator 250 determines a fog node resource allocation and partitioning for each client application based on the respective RPVs provided and current usage of fog node resources within the fog network 200. For example, as shown in FIG. 4, the first client application associated with the first client application request 410 is allocated fog node resources on fog nodes 211, 212, 213, 221, and 222 as indicated by dashed box 410*a*. Similarly, the second client application associated with the second client application request 420 is allocated fog node resources on fog nodes 223 and 224 as indicated by dashed box 420*a*; and, the third client application associated with the third client application request 430 is allocated fog node resources on fog nodes 214, 215, 224, 225, 234, 235, 244, and 245 as indicated by dashed box 430*a*. In this example, fog node 224 is utilized to service both the second and third client application requests 420, 430. In other words, the resource of fog node 224 are shared by multiple tenants.

In various implementations, the fog orchestrator 250 performs continuous or periodic background measurement of key fog network performance metrics such as: round-trip latency between endpoint devices and computational and storage resources, or frame delay of a video analytics solution, or start-up time of a critical dynamic application. If a performance metric breaches a threshold set by application requirements, the fog orchestrator 250 moves some of the separable components of the client application to fog nodes lower in the hierarchy (i.e., closer to the endpoint devices) in order to help reduce latency and/or otherwise improve the performance metric. In some implementations, separable components of the client applications(s) with higher RPVs are given preferential access to fog nodes lower in the hierarchy by the fog orchestrator 250. Conversely, when the fog orchestrator 250 identifies margins indicating that some performance degradation can be tolerated by a client application (or one or more separable portions of a client application), the fog orchestrator 250 moves some of the separable components of the client application to fog nodes higher in the hierarchy (e.g., closer to cloud-based resource and/or core network resources) in order to try to improve fog network efficiency, and provide access to lower level fog node resources for other applications. In some implementations, separable components of the client application with lower RPVs are the first to be moved higher into the hierarchy by the fog orchestrator 250.

With continued reference to FIG. 4, as an illustrative and non-limiting example, the first client application (associated with request 410) is a video analytics algorithm. As described above, the first client application is allocated fog node resources on fog nodes 211, 212, 213, 221, and 222, as indicated by dashed box 410*a*, that are included in the first and second fog node layers 210, 220 (see, FIG. 2). The fog nodes 211, 212, 213 (in the first layer 210) are assigned a two-stage pipeline of low-level analytics application components (e.g., image optimization and feature extraction), and the fog nodes 221, 222 (in the second layer 220) are assigned two higher-level analytics application components (e.g., object recognition and geofence perimeter alarms). If performance measures indicate too high of a latency, the fog orchestrater 250 may refactor the application pipeline by moving the object recognition processes from the second fog node layer 220 to the first fog node layer 210. Refactoring the pipeline reduces inter-node traffic and makes additional higher performance fog node resources available to the first application on the first fog node layer 210 (which are fewer latency-inducing network hops away). Continuing the example, the fog orchestrator 250 could reassign fog node resources on fog nodes 214, 215 from the third application to the first application, and move separable application components of the third application higher into the fog network 200.

In another example, the first client application (associated with request 410) includes a real-time control loop provided to manage breaking within a railway system or subway system. Separable components of the real-time control loop may be split such that fog nodes 211, 212, 213 are assigned separable components associated with track sensor processing and break actuator modulation functions, and fog nodes 221, 222 are assigned separable components associated with PTC (positive train control) and safety applications. If there are unsatisfied requests fog node resources on fog nodes 211, 212, 213 by other applications, the fog orchestrator 250 could move the sensor processing components to fog nodes in the second fog node layer 220 (assuming it has adequate resources available) freeing up resources on the first fog node layer 210 for other applications.

In addition to the North-South (between levels) repartitioning described above, various implementations include East-West repartitioning (across nodes on the same level). Systems having trouble satisfying performance targets by utilizing the resources on a single fog node at a certain level may locate a nearby peer-level node with extra capacity, and split the application that was running on one fog node to run on two or more fog nodes. In some implementations, this is accomplished in part by the fog orchestrator 250 generating additional application component RPV entries that can be added into an application component manifest or maintained by the fog orchestrator 250. If an application is using multiple parallel nodes on one level, and is experiencing high performance margins, the fog orchestrator 250 could consolidate separable components onto fewer fog nodes or even a single fog node. A similar repartitioning function could happen in heterogeneous processor systems (that have X86 processors along with GPUs, DSPs and/or FPGAs perforating acceleration functions). Performance metrics can help determine when to repartition the algorithm components of an application among the various processing resource types.

Additionally and/or alternatively, in some implementations, methods performed by the fog orchestrator 250 also determine: demand priorities; client acceptance of repartitioning alternatives; demand, from client applications, for fog node resources in order to satisfy performance targets; and/or, indicators from competing client applications to make tradeoffs with one another pertaining to prioritized allocation of contested fog node resources.

Figure 5:
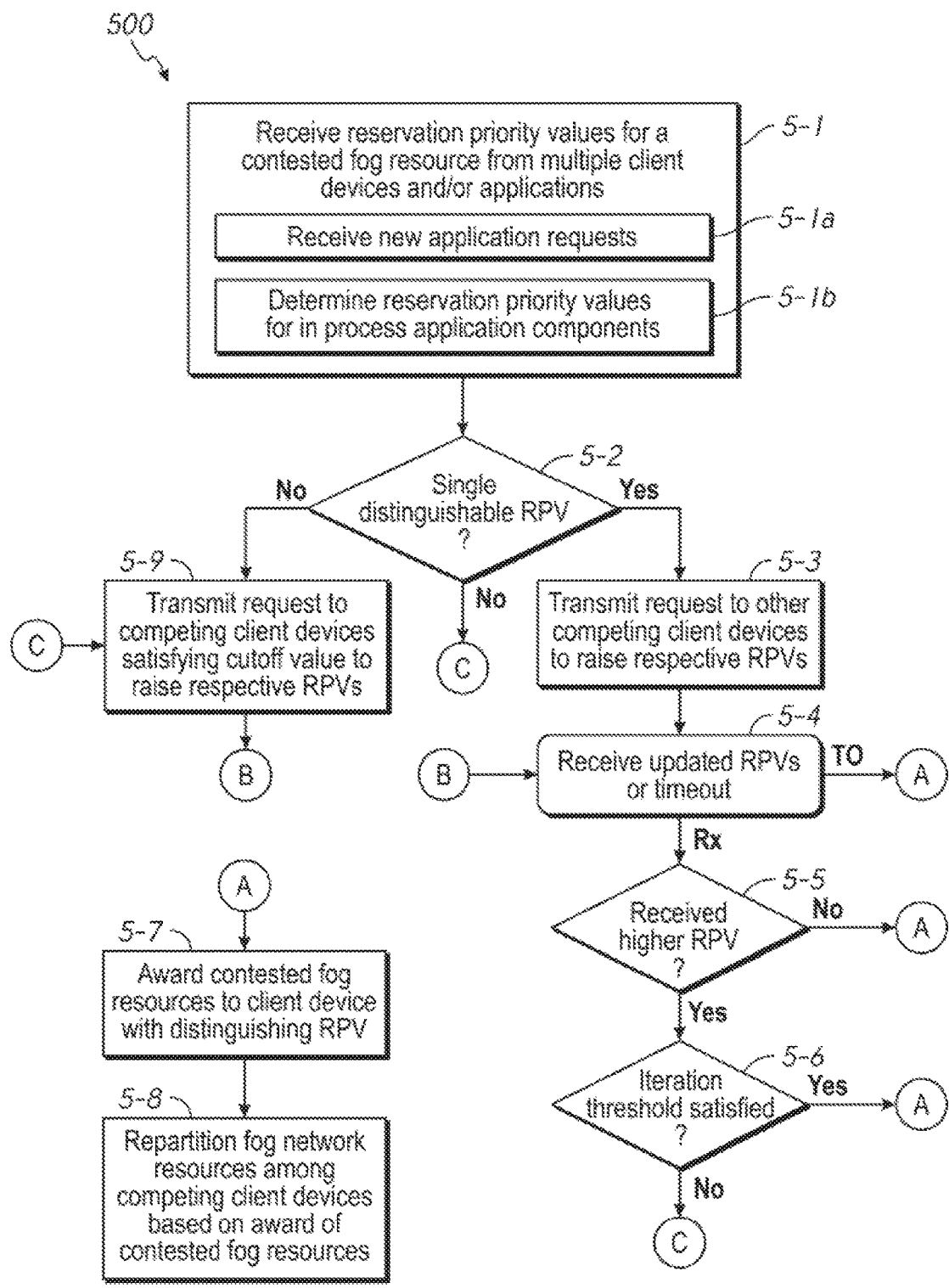
FIG. 5 is a flowchart representation of a method of determining fog network resource allocations and client application partitioning according to some implementations.

To that end, FIG. 5 is a flowchart representation of a method 500 of supporting fog network resource allocations and client application partitioning based on RPVs received from client devices in accordance with some implementations. In some implementations, the method 500 is performed by a fog orchestrator (e.g., the fog orchestrator 250) configured to determine fog node resource allocations and partition client applications by: determining demand priorities; client acceptance of repartitioning alternatives; demand, from client applications, for fog node resources in order to satisfy performance targets; and/or, indicators from competing client applications to make tradeoffs with one another pertaining to prioritized allocation of contested fog node resources. Briefly, the method 500 includes receiving RPVs from competing client applications for a contested fog node resource, and awarding the contested fog node resource to the client application with a distinguishing RPV.

As represented by block 5-1, in some implementations the method 500 includes receiving RPVs for a contested fog node resource from multiple client devices and/or client applications. For example, with reference to FIG. 2, the fog orchestrator 250 receives RPVs for a contested fog node resource from the smartphone 130*a*, the TV 130*b*, the laptop 130*c*, and the tablet computing device 130*d*. As described above with reference to FIG. 4, in some implementations, the RPVs are included in client application requests, that each include a client application manifest. A client application manifest includes a listing of separable components of the corresponding client application, and a RPV associated with each of the separable components of the corresponding client application. In some implementations, as represented by block 5-1*a*, receiving the RPVs includes receiving new client application requests that include the RPVs in corresponding client application manifests. In some implementations, as represented by block 5-1*b*, receiving the RPVs includes determining RPVs for in process application components for currently executing partitions and resource allocations. This allows currently running client applications to resubmit RPVs in order to update the fog orchestrator 250 with values that indicate a demand preference for continued operation utilizing a current partition and assignment of fog node resources, and/or indicate tolerance to yield assigned fog node resources in exchange for different fog node resources and/or prioritized access to fog node resources at a later time. The tolerance to yield data may also include information about which alternative (horizontally or vertically) fog resources the application might tolerate, if specific application components are moved to different fog nodes. In other words, the tolerance to yield data characterizes how execution performance for a specific application component either deteriorates or improves in response to moving the application component to another fog node and/or fog resource.

As represented by block 5-2, the method 500 includes determining whether or not there is a single distinguishable RPV associated with a particular one of the competing client devices (or competing client applications). If there is not a single distinguishable RPV associated with a particular one of the competing client devices ("No" path from block 5-2), the method 500 proceed to the portion of the method represented by block 5-9, which is described in greater detail below. If there is a single distinguishable RPV associated with a particular one of the competing client devices ("Yes" path from block 5-2), in some implementations as represented by block 5-3, the method 500 includes transmitting a request to the other competing client devices that invites the other competing client devices to raise the respective RPVs previously submitted. In other words, the other competing client devices are given the option to modify the demand priority for the contested fog node resource of all or portions of corresponding client applications. Continuing the example above, if the fog orchestrator 250 initially determines that the smartphone 130a has the distinguishing RPV (e.g., the respective RPV being greater than any other received), the fog orchestrator 250 invites the TV 130b, the laptop 130c, and the tablet computing device 130d to resubmit RPV values for the contested fog node resource. In the current example, identifying the distinguishing RPV is based on identifying the highest RPV received. However, those of ordinary skill in the art will appreciate from the present disclosure that identifying the distinguishing RPV may also be based on other criteria. For example, in some implementations, identifying the distinguishing RPV includes selecting based on the magnitude of the RPVs in combination with respective SLA parameters associated with each client device. In some implementations, identifying the distinguishing RPV includes selecting based on a function of the lowest RPV because the operator establishes an inverse relationship between a RPV and the represented priority.

The other competing client devices do not have to respond with new RPV. In various implementations, a competing client device will determine whether or not to respond with a higher RPV based on a respective SLA. For example, the SLA associated with a competing client device may limit the extent to which the competing client device can raise a RPV for one or more fog node resources (e.g., based on resource type, time of day, QoS limits, etc.). In various implementations, a competing client device will determine whether or not to respond with a higher RPV based on operation parameters specific to the competing client device. For example, the operation parameters associated with a competing client device may cause the competing client device to raise the previously submitted RPV in increments in response to requests to do so from the fog orchestrator 250. In another example, the operation parameters associated with a competing client device may cause the competing client device to forego raising the previously submitted RPV so long as determined performance margins indicate that the competing client device is within a tolerable QoS range. In various implementations, a client may be limited in the total RPVs it can submit by its higher order SLAs, or other mechanisms. When an application approaches such a limit, resubmissions associated with the application may be barred from including higher RPV values, and the application is forced to stay within a total resource allocation plan (or SLA). The aforementioned examples are provided for illustrative purposed only and are not exhaustive. Those of ordinary skill in the art will appreciate from the present disclosure that in various implementations a competing client device is configured to determine whether or not to raise a previously submitted RPV based on any number of factors, including operating parameters and a respective SLA.

Subsequently, as represented by block 5-4, the method 500 includes providing a threshold response duration for receiving responses from the other competing client devices that are not associated with the distinguishable RPV. If the threshold response duration expires without any of the other competing client devices providing upwardly revised RPVs ("TO" path from block 5-4), in various implementations the method 500 proceeds to the portion of the method represented by block 5-7, which is described in greater detail below. On the other hand, if one or more of the other competing client devices provides upwardly revised RPVs within the threshold response duration ("Rx" path from block 5-4), as represented by block 5-5, in some implementation the method 500 includes determining whether or not any of the upwardly revised RPVs is greater than the distinguishable RPV previously received. If none of the upwardly revised RPVs is greater than the distinguishable RPV previously received ("No" path from block 5-5), in various implementations the method 500 proceeds to the portion of the method represented by block 5-7, which is described in greater detail below.

On the other hand, if at least one of the upwardly revised RPVs is greater than the distinguishable RPV previously received ("Yes" path from block 5-5), as represented by block 5-6, in some implementations the method 500 includes determining whether or not an iteration threshold has been satisfied. In other words, the method 500 includes determining whether or not the competing client devices have been provided with sufficient opportunity to compete for the contested fog node resource by upwardly revising previously submitted RPVs. In accordance with various implementations, providing each of the competing client devices with a sufficient opportunity to compete for the contested fog node resource includes iteratively requesting upwardly revised RPVs from the client devices for a predetermined number of iterations or until the competing client devices stop providing upwardly revised RPVs in response to transmitted requests.

If the iteration threshold has not been satisfied ("No" path from block 5-7), as represented by block 5-9, in some implementations the method 500 includes transmitting a request to competing client devices, associated with RPVs that satisfy a cutoff value, for upwardly revised RPVs. In other words, the method 500 includes culling the field of competing client devices by selectively transmitting the request to client devices that have provided a RPV above a cutoff value, and not transmitting the request to client devices that provided a RPV below the cutoff value. In some implementations, this has the effect of expediting the resource allocation and partitioning process. Subsequently, the method 500 proceeds to the portion of the method represented by block 5-4, which is described in greater detail above.

Referring again to block 5-6, if the iteration threshold has been satisfied ("Yes" path from block 5-7), as represented by block 5-7, in some implementations the method 500 includes awarding the contested fog node resource to the particular client device with the distinguishing RPV after the iteration threshold has been satisfied or the other competing devices have yielded by not submitting upwardly revised RPVs. Subsequently, in various implementations, as represented by block 5-8, the method 500 includes repartitioning the fog network resources among the competing client devices based on the award of the contested fog resources as described above with reference to FIG. 4.

Figure 6:
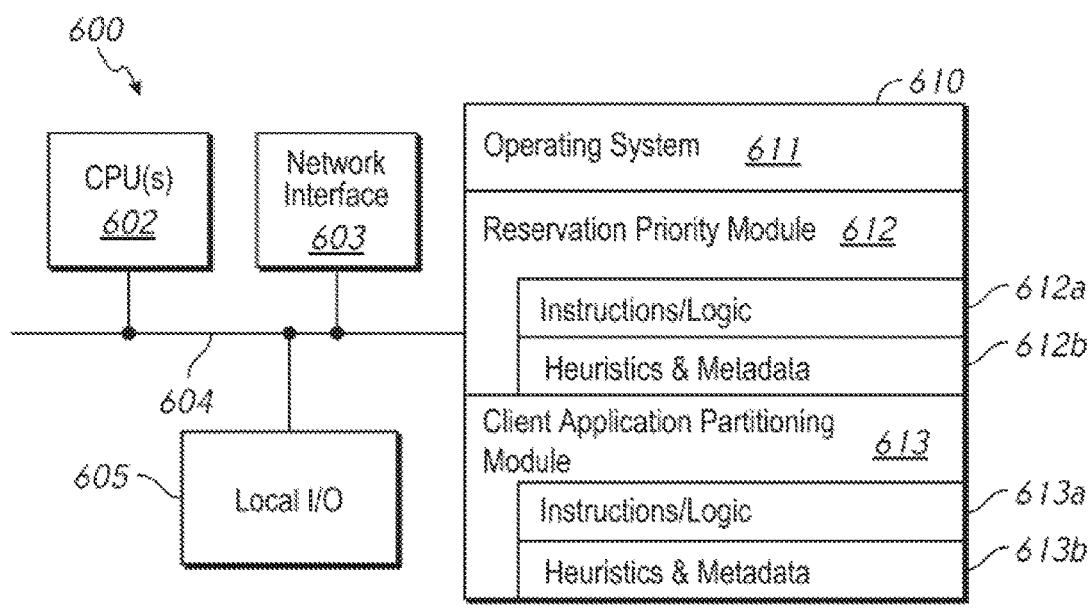
FIG. 6 is a block diagram of a fog orchestrator in accordance with some implementations.

FIG. 6 is a block diagram of a fog orchestrator 600 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the fog orchestrator 600 includes one or more processing units (CPU's) 602, a network interface 603, a local I/O 605, a memory 610, and one or more communication buses 604 or interconnecting these and various other components.

In some implementations, the network interface 603 is provided to establish and maintain communication channels with fog nodes within a fog network, client devices and endpoint devices, external networks, the cloud, and third party services and resources.

In some implementations, the communication buses 604 include circuitry that interconnects and controls communications between system components. The memory 610 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 610 optionally includes one or more storage devices remotely located from the CPU(s) 602. The memory 610 comprises a non-transitory computer readable storage medium.

In some implementations, the memory 610 or the non-transitory computer readable storage medium of the memory 610 stores the following programs, modules and data structures, or a subset thereof including an optional operating system 611, a reservation priority module 612, and a fog resource partitioning module 613.

The operating system 611 includes procedures for handling various basic system services and for performing hardware dependent tasks.

In some implementations, the reservation priority module 612 is configured to determine fog node resource allocations by: determining demand priorities; client acceptance of repartitioning alternatives; demand, from client applications, for fog node resources in order to satisfy performance targets; and/or, indicators from competing client applications to make tradeoffs with one another pertaining to prioritized allocation of contested fog node resources. To that end, in various implementations, the reservation priority module 612 includes instructions and/or logic 612a, and heuristics and metadata 612b. More detailed examples of the operation of the reservation priority module 612 are described above with reference to FIGS. 4 and 5.

In some implementations, the client application partitioning module 613 is configured to partition client applications based on respective RPVs and current usage of fog node resources within a fog network. To that end, in various implementations, the client application partitioning module 613 includes instructions and/or logic 613a, and heuristics and metadata 613b. In particular, heuristics and metadata 613b includes data structures including, for example, an application component manifest (e.g., application component manifest 411). More detailed examples of the operation of the client application partitioning module 613 are described above with reference to FIGS. 4 and 5.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a fog orchestrator configured to determine allocations of fog resources for competing client applications and partition the competing client applications based on the fog resource allocations, the fog orchestrator including a non-transitory memory, one or more processors, and one or more network interfaces:

receiving, from a plurality of client devices, reservation priority values (RPVs) associated with a plurality of client applications competing for a contested fog node resource;

transmitting, to a subset of the plurality of client devices, a request to provide updated RPVs for the contested fog node resource, wherein transmitting includes iteratively transmitting the request until responses to a last transmitted request are not received within a threshold response duration for receiving responses;

awarding the contested fog node resource to one of the plurality of client applications based on the received RPVs and any updated RPVs received in response to the transmitted request; and determining, for each of the plurality of client applications, a respective mapping for a respective plurality of separable components of the client application based on the awarded contested fog node resource, each respective mapping includes assignment of the respective plurality of separable components to fog node resources within the fog network.

2. The method of claim 1, wherein each of the plurality of client applications including a respective plurality of separable components characterizing a processing pipeline that together generate one or more application-level outputs, wherein the processing pipeline includes at least one of sequential processing components and parallel processing components.

3. The method of claim 1, wherein the fog resources include a combination of one or more of processing resources, memory resources, connectivity resources, and input-output (I/O) interface resources.

4. The method of claim 1, wherein receiving the RPVs receiving new client application requests that include the RPVs.

5. The method of claim 4, wherein each new client application request includes a client application manifest listing of separable components of the corresponding client application, and a RPV associated with each of the separable components of the corresponding client application.

6. The method of claim 1, wherein receiving the RPVs includes determining RPVs for in process application components for currently executing partitions and fog node resource allocations.

7. The method of claim 1, further comprising selecting the subset of the plurality of client devices to transmit the request to provide updated RPVs for the contested fog node resource to by selecting client devices that previously provided RPVs that satisfy a cutoff value.

8. The method of claim 1, further comprising selecting the subset of the plurality of client devices to transmit the request to provide updated RPVs for the contested fog node resource to by selecting client devices that previously provided RPVs that are below a single highest RPV value provided by another one of the plurality of client devices.

9. The method of claim 1, wherein transmitting includes iteratively transmitting the request until an iteration threshold has been satisfied.

10. The method of claim 1, wherein awarding the contested fog node resource includes selecting the client application associated with the highest RPV received.

11. The method of claim 1, wherein awarding the contested fog node resource includes selecting the client application based on a combination of service level agreement parameters and a RPV magnitude.

12. The method of claim 1, wherein awarding the contested fog node resource includes selecting the client application based on priority levels associated with a spectrum of RPV magnitudes.

13. The method of claim 1, wherein determining the respective mappings includes repartitioning the fog node resources among the competing client devices based on the award of the contested fog node resources, wherein at least one in process application is provided with a new mapping to fog node resources.

14. The method of claim 13, wherein the new mapping to fog node resources for the at least one in process application includes at least one of moving a separable component of the at least one in process application to a fog node higher in a fog node hierarchy and moving a separable component of the at least one in process application to a fog node lower in a fog node hierarchy.

15. A system comprising:

a plurality of fog nodes arranged in a hierarchical network between a gateway device and a plurality of endpoint devices; and a fog orchestrator configured to determine allocations of fog resources for competing client applications and partition the competing client applications based on the fog resource allocations, the fog orchestrator including one or more network interfaces, one or more processors, and a non-transitory memory that includes instructions that when executed by the one or more processors causes the fog orchestrator to:

receive, from a plurality of client devices, reservation priority values (RPVs) associated with a plurality of client applications competing for a contested fog node resource;

transmit, to a subset of the plurality of client devices, a request to provide updated RPVs for the contested fog node resource, wherein transmitting includes iteratively transmitting the request until responses to a last transmitted request are not received within a threshold response duration for receiving responses;

award the contested fog node resource to one of the plurality of client applications based on the received RPVs and any updated RPVs received in response to the transmitted request; and determine, for each of the plurality of client applications, a respective mapping for a respective plurality of separable components of the client application based on the awarded contested fog node resource, each respective mapping includes assignment of the respective plurality of separable components to fog node resources within the fog network.

16. The system of claim 15, wherein the hierarchical network includes a plurality of layers, wherein each layer includes a group of one or more fog nodes, defined by relative distance ranges or latency ranges relative to the gateway device or endpoint devices.

17. The system of claim 15, wherein each of the plurality of client applications including a respective plurality of separable components characterizing a processing pipeline that together generate one or more application-level outputs.

18. The system of claim 15, wherein fog resources include a combination of one or more of processing resources, memory resources, connectivity resources, and input-output (I/O) interface resources.

19. A fog node orchestrator comprising:
means for receiving, from a plurality of client devices, reservation priority values (RPVs) associated with a plurality of client applications competing for a contested fog node resource;
means for transmitting, to a subset of the plurality of client devices, a request to provide updated RPVs for the contested fog node resource, wherein transmitting includes iteratively transmitting the request until responses to a last transmitted request are not received within a threshold response duration for receiving responses;
means for awarding the contested fog node resource to one of the plurality of client applications based on the received RPVs and any updated RPVs received in response to the transmitted request; and
means for determining, for each of the plurality of client applications, a respective mapping for a respective plurality of separable components of the client application based on the awarded contested fog node resource, each respective mapping includes assignment of the respective plurality of separable components to fog node resources within the fog network.

20. The fog node orchestrator of claim 19, wherein each of the plurality of client applications including a respective plurality of separable components characterizing a processing pipeline that together generate one or more application-level outputs.

* * * * *